United States Patent
Kwong et al.

(10) Patent No.: US 12,045,675 B2
(45) Date of Patent: Jul. 23, 2024

(54) SAFETY MONITOR FOR INCORRECT KERNEL COMPUTATION

(71) Applicant: ATI Technologies ULC, Markham (CA)

(72) Inventors: Tung Chuen Kwong, Richmond Hill (CA); Clarence Ip, Unionville (CA); Benjamin Koon Pan Chan, Markham (CA); Edward Lee Kim-Koon, Richmond Hill (CA); Meghana Manjunatha, North York (CA)

(73) Assignee: ATI Technologies ULC, Markham (CA)

( * ) Notice: Subject to any disclaimer, the term of this patent is extended or adjusted under 35 U.S.C. 154(b) by 659 days.

(21) Appl. No.: 16/457,237

(22) Filed: Jun. 28, 2019

(65) Prior Publication Data

US 2020/0409773 A1    Dec. 31, 2020

(51) Int. Cl.
*G06F 9/30* (2018.01)
*G06F 9/38* (2018.01)
(Continued)

(52) U.S. Cl.
CPC .......... *G06F 9/545* (2013.01); *G06F 9/30036* (2013.01); *G06F 9/3877* (2013.01);
(Continued)

(58) Field of Classification Search
CPC .... G06F 9/545; G06F 9/30036; G06F 9/3877; G06F 9/5072; G06F 9/541; G06F 11/3672
See application file for complete search history.

(56) References Cited

U.S. PATENT DOCUMENTS

| 7,805,283 B2 * | 9/2010 | Zangl | G06F 30/23 703/2 |
| 2009/0024908 A1 * | 1/2009 | Kottke | G06F 11/0739 714/799 |

(Continued)

OTHER PUBLICATIONS

Pai et al. Improving GPGPU Concurrency with Elastic Kernels. [online] ACM., pp. 407-418. Retrieved From the Internet <https://dl.acm.org/doi/pdf/10.1145/2490301.2451160> (Year: 2013).*

(Continued)

*Primary Examiner* — Emerson C Puente
*Assistant Examiner* — Jonathan R Labud
(74) *Attorney, Agent, or Firm* — Kowert, Hood, Munyon, Rankin & Goetzel, P.C.; Rory D. Rankin

(57) ABSTRACT

Systems, apparatuses, and methods for implementing a safety monitor framework for a safety-critical graphics processing unit (GPU) compute application are disclosed. A system includes a safety-critical GPU compute application, a safety monitor, and a GPU. The safety monitor receives a compute grid, test vectors, and a compute kernel from the safety-critical GPU compute application. The safety monitor generates a modified compute grid by adding extra tiles to the original compute grid, with the extra tiles generated based on the test vectors. The safety monitor provides the modified compute grid and compute kernel to the GPU for processing. The safety monitor determines the likelihood of erroneous processing of the original compute grid by comparing the actual results for the extra tiles with known good results. The safety monitor complements the overall fault coverage of the GPU hardware and covers faults only observable at the application programming interface (API) level.

19 Claims, 8 Drawing Sheets

(51) Int. Cl.
  *G06F 9/50* (2006.01)
  *G06F 9/54* (2006.01)
  *G06F 11/36* (2006.01)

(52) U.S. Cl.
  CPC ............ *G06F 9/5072* (2013.01); *G06F 9/541* (2013.01); *G06F 11/3672* (2013.01)

(56) References Cited

U.S. PATENT DOCUMENTS

| | | | | |
|---|---|---|---|---|
| 2012/0204154 A1* | 8/2012 | Li | ................. | G06F 11/3684 717/124 |
| 2013/0246852 A1* | 9/2013 | Osada | ................. | G06F 11/2236 714/33 |
| 2018/0336111 A1* | 11/2018 | Gendler | ................. | G06F 1/3287 |
| 2019/0171489 A1* | 6/2019 | Guo | ................. | G06F 9/4881 |
| 2019/0379699 A1* | 12/2019 | Katragadda | ......... | H04L 63/1425 |
| 2020/0257840 A1* | 8/2020 | Huh | ................. | G06N 3/08 |

OTHER PUBLICATIONS

"Cuda C Programming Guide", Design Guide, NVIDIA, May 2019, 316 pages, PG-02829-001_v10.1.

"BlackBerry QNX Platform for Instrument Clusters", BlackBerry QNX, 2018, 4 pages, https://blackberry.qnx.com/content/dam/qnx/products/instrument-clusters/instrument-clusters-product-brief.pdf. [Retrieved Jun. 17, 2019].

Bramley, Richard, "Functional Safety and the GPU", Nvidia, May 11, 2017, 33 pages, http://on-demand.gputechconf.com/gtc/2017/presentation/s7372-richard-bramley-functional-safety.pdf. [Retrieved Mar. 16, 2019].

* cited by examiner

SAFETY MONITOR FOR INCORRECT KERNEL COMPUTATION

BACKGROUND

Description of the Related Art

When a graphics processing unit (GPU) is operating in a safety-critical environment, it is desired to monitor the GPU to check for abnormal behavior. A typical implementation for monitoring the GPU inserts monitoring logic into the GPU hardware sub-blocks. For example, a machine check architecture is a mechanism whereby monitoring logic in the processing hardware checks for abnormal behavior. However, this approach, while providing monitoring in the lower levels of hardware, may overlook failure only observable at the output of the GPU. Nor will this approach detect random intermittent faults at the application programming interface (API) level.

When operating a GPU in a safety-critical environment, any number of kernels can be launched on the GPU to execute one or more workloads. As used herein, the term "kernel" is defined as a function declared in a program. A "kernel" can be executed concurrently on multiple processing elements. As used herein, the term "workload" is defined as the total amount of work being performed to execute a section of code including one or more functions operating on n-dimensional input data. As used herein, the term "work-item" is defined as one of a collection of parallel executions of a kernel invoked on a processing unit by a command. A work-item can be executed by one or more processing elements as part of a workgroup executing on a processing unit. As used herein, the term "workgroup" is defined as a collection of related work-items that execute on a single processing unit.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
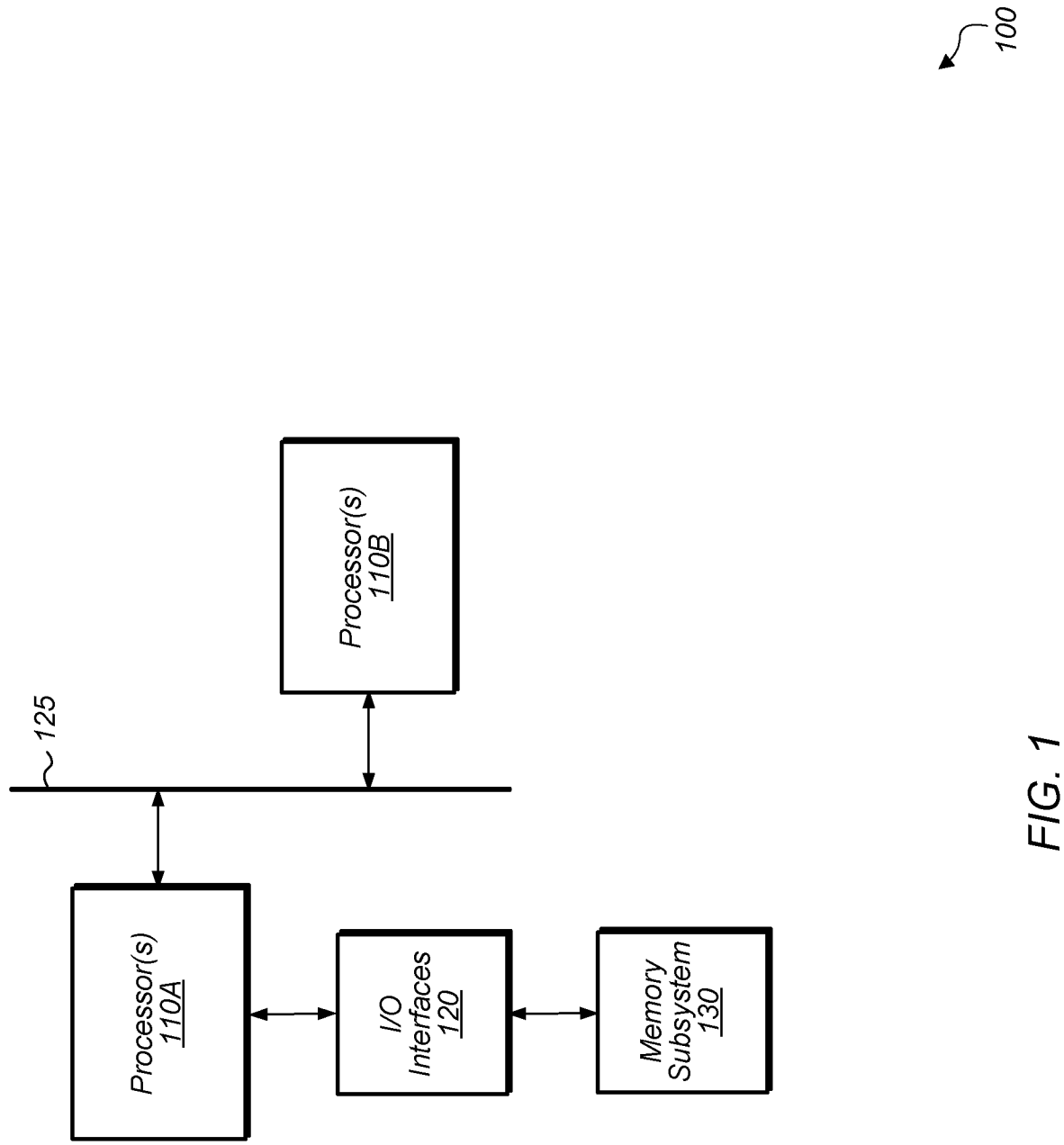
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing a safety monitor framework for a safety-critical graphics processing unit (GPU) compute application are disclosed herein. In one implementation, a system includes a safety-critical GPU compute application, a safety monitor, and a GPU. The safety monitor receives a compute grid, test vectors, and a compute kernel from the safety-critical GPU compute application. The safety monitor generates a modified compute grid by adding extra tiles to the original compute grid, with the extra tiles generated based on the test vectors. The safety monitor provides the modified compute grid and compute kernel to the GPU for processing. The safety monitor determines the likelihood of erroneous processing of the original compute grid by comparing the actual results for the extra tiles with known good results corresponding to the test vectors. The safety monitor complements the overall fault coverage of the GPU hardware and covers faults only observable at the application programming interface (API) level.

In one implementation, for a given safety-critical application, the same kernel and graph will be executed repeatedly for each new incoming request. Before each execution, a safety monitor ensures that the stored kernel and graph have not been inadvertently modified. In one implementation, the graph defines a plurality of functions to be performed on an input dataset. For example, in one implementation, the graph is a computer vision (CV) graph which defines a plurality of image processing functions that should be performed to transform an input image or each frame of a stream of video frames. In one implementation, these image processing functions are defined by the nodes of a directed acyclic graph (DAG). The CV graph can be designed to be compliant with any of various frameworks (e.g., the OpenVX framework). In other implementations, other types of graphs are used to specify the operations to be performed by the processing hardware.

In one implementation, the safety monitor implements a self-test, memory protection, and signature verification scheme to confirm the correctness of the created kernel for repeated computations. The self-test, together with input test vectors, is executed on each new kernel or graph creation and registration. Once the correctness of the kernel and graph is confirmed, the kernel and graph image are protected using memory protection mechanism. Before submitting the kernel and graph to the processing hardware, the safety monitor implements a signature verification scheme to detect any inadvertent modification.

In one implementation, when a kernel is submitted by an application, a software driver converts the kernel to a binary version that is executable by the processing hardware. Then, the binary version of the kernel (i.e., the kernel binary) is validated against a known test vector. If the result generated by processing the known test vector matches the expected result, then the kernel binary is validated. Then, the kernel binary is stored and is allowed to be used for execution. At this point, the software driver generates a signature from the kernel binary and then the software driver stores this signature. For each subsequent execution of the kernel binary, a new signature is generated from the kernel binary and compared against the stored signature. If the new signature matches the stored signature, then execution is allowed to proceed. Otherwise, corrective action is taken if the new signature does not match the stored signature.

Referring now to FIG. 1, a block diagram of one implementation of a computing system 100 is shown. In one implementation, computing system 100 includes at least processor(s) 110A-B, input/output (I/O) interfaces 120, bus 125, and memory subsystem 130. In other implementations, computing system 100 can include other components and/or computing system 100 can be arranged differently. Processors(s) 110A-B are representative of any number and type of processing units (e.g., central processing unit (CPU), graphics processing unit (GPU), digital signal processor (DSP), field programmable gate array (FPGA), application specific integrated circuit (ASIC)). Memory subsystem 130 includes any number and type of memory devices. For example, the type of memory in memory subsystem 130 can include high-bandwidth memory (HBM), non-volatile memory (NVM), Dynamic Random Access Memory (DRAM), Static Random Access Memory (SRAM), NAND Flash memory, NOR flash memory, Ferroelectric Random Access Memory (FeRAM), or others. Memory subsystem 130 is accessible by processor(s) 110A-B. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

Processor(s) 110A-B are used by any of a variety of different safety-critical applications which vary according to the implementation. For example, in one implementation, processor(s) 110A-B are used in an automotive application. For example, software executing on processor(s) 110A-B controls one or more functions of a self-driving vehicle (i.e., autonomous vehicle), driver-assist vehicle, or advanced driver assistance system. In other implementations, software executing on processor(s) 110A-B is trained and customized for other types of use cases.

In various implementations, computing system 100 is a computer, laptop, mobile device, game console, server, streaming device, wearable device, or any of various other types of computing systems or devices. In some implementations, computing system 100 is integrated within a robotic system, self-driving vehicle, autonomous drone, surgical tool, or other types of mechanical devices or systems. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
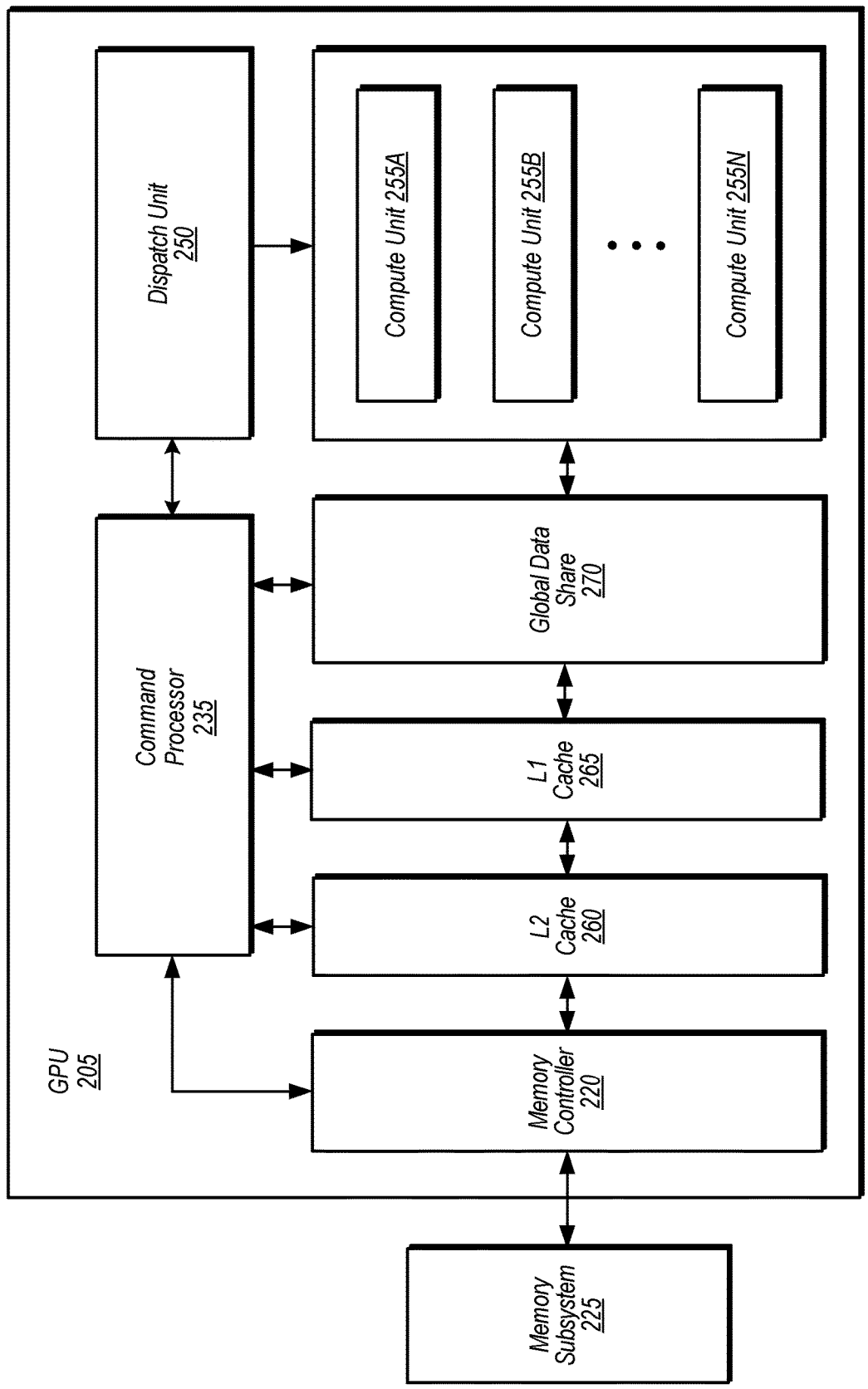
FIG. 2 is a block diagram of another implementation of a computing system.

Turning now to FIG. 2, a block diagram of another implementation of a computing system 200 is shown. In one implementation, system 200 includes GPU 205 and memory subsystem 225. System 200 also includes other components which are not shown to avoid obscuring the figure. In one implementation, GPU 205 includes at least command processor 235, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in at least one processor of processor(s) 110A-B (of FIG. 1).

In various implementations, computing system 200 executes any of various types of software applications. In one implementation, as part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
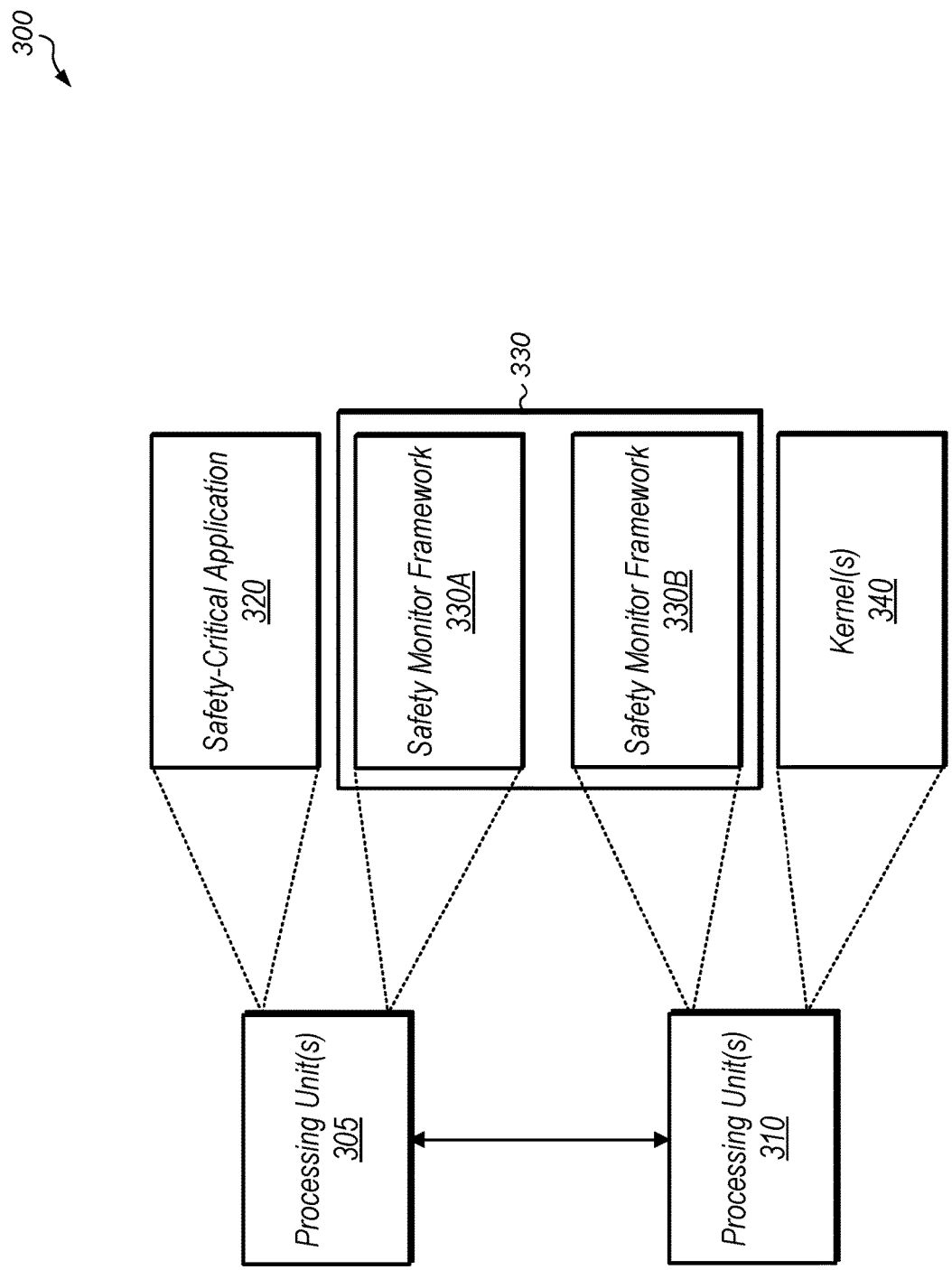
FIG. 3 is a block diagram of one implementation of a safety-critical GPU compute application executing in a safety-critical system.

Referring now to FIG. 3, a block diagram of one implementation of a safety-critical application 320 executing in a safety-critical system 300 is shown. In one implementation, safety-critical system 300 includes at least processing unit(s) 305 and 310 which are representative of any number and type of processing units. It is noted that safety-critical system 300 can also include any number of other components which are not shown to avoid obscuring the figure. In one implementation, processing unit(s) 305 include one or more central processing units (CPUs). In other implementations, processing unit(s) 305 can include other types of processing units. In one implementation, processing unit(s) 310 include one or more graphics processing unit (GPUs). In other implementations, processing unit(s) 310 can include other types of processing units (e.g., digital signal processors (DSPs), field programmable gate arrays (FPGAs), application specific integrated circuits (ASICs)).

In one implementation, safety-critical application 320 executes on processing unit(s) 305. Safety-critical application 320 is representative of any type of software application that executes in a hazardous environment where safety is of high importance. For example, in one implementation, safety-critical application 320 controls a self-driving or driver-assisted automobile or other vehicle. In other implementations, safety-critical application 320 operates within a robot, as the auto-pilot control mechanism in an airplane, or as part of other systems in various challenging, high-risk environments.

In one implementation, a first portion of safety monitor framework 330 (i.e., safety monitor framework 330A) executes on processing unit(s) 305 and a second portion of safety monitor framework 330 (i.e., safety monitor framework 330B) executes on processing unit(s) 310. In other implementations, safety monitor framework 330 executes entirely on processing unit(s) 305 or entirely on processing unit(s) 310. In one implementation, kernel(s) 340 are invoked from the instructions of application 320. In one implementation, kernel(s) 340 include software instructions that are designed to execute on processing unit(s) 310.

In one implementation, safety-critical application 320 provides a compute grid to be processed by processing unit(s) 310. In this implementation, safety-critical application 320 also provides kernel 340 to processing unit(s) 310 to be executed for processing the compute grid. In one implementation, safety monitor framework 330 receives the compute grid that is being sent to processing unit(s) 310 from safety-critical application 320. In one implementation, safety monitor framework 330 modifies the compute grid and then sends the modified compute grid to processing unit(s) 310. After processing unit(s) 310 have processed the modified compute grid, processing unit(s) 310 send the processing results to safety-critical application 320 via safety monitor framework 330. Safety monitor framework 330 analyzes the results to determine if a fault has occurred. In one implementation, safety monitor framework 330 generates a confidence indicator which specifies how confident safety monitor framework 330 is that processing unit(s) 310 accurately processed the compute grid provided by safety-critical application 320. Safety monitor framework 330 conveys the confidence indicator and a modified version of the processing results to safety-critical application 320. In one implementation, safety-critical application 320 takes one or more corrective actions (e.g., shutting down, rebooting the system, retrying the same compute grid, generating a warning signal for a user, reducing speed of the vehicle, changing an operating mode) if the confidence indicator does not meet a threshold. In some embodiments, not meeting the threshold means the confidence indicator is below the threshold. In other embodiments, not meeting the threshold means the confidence indicator is above the threshold.

Figure 4:
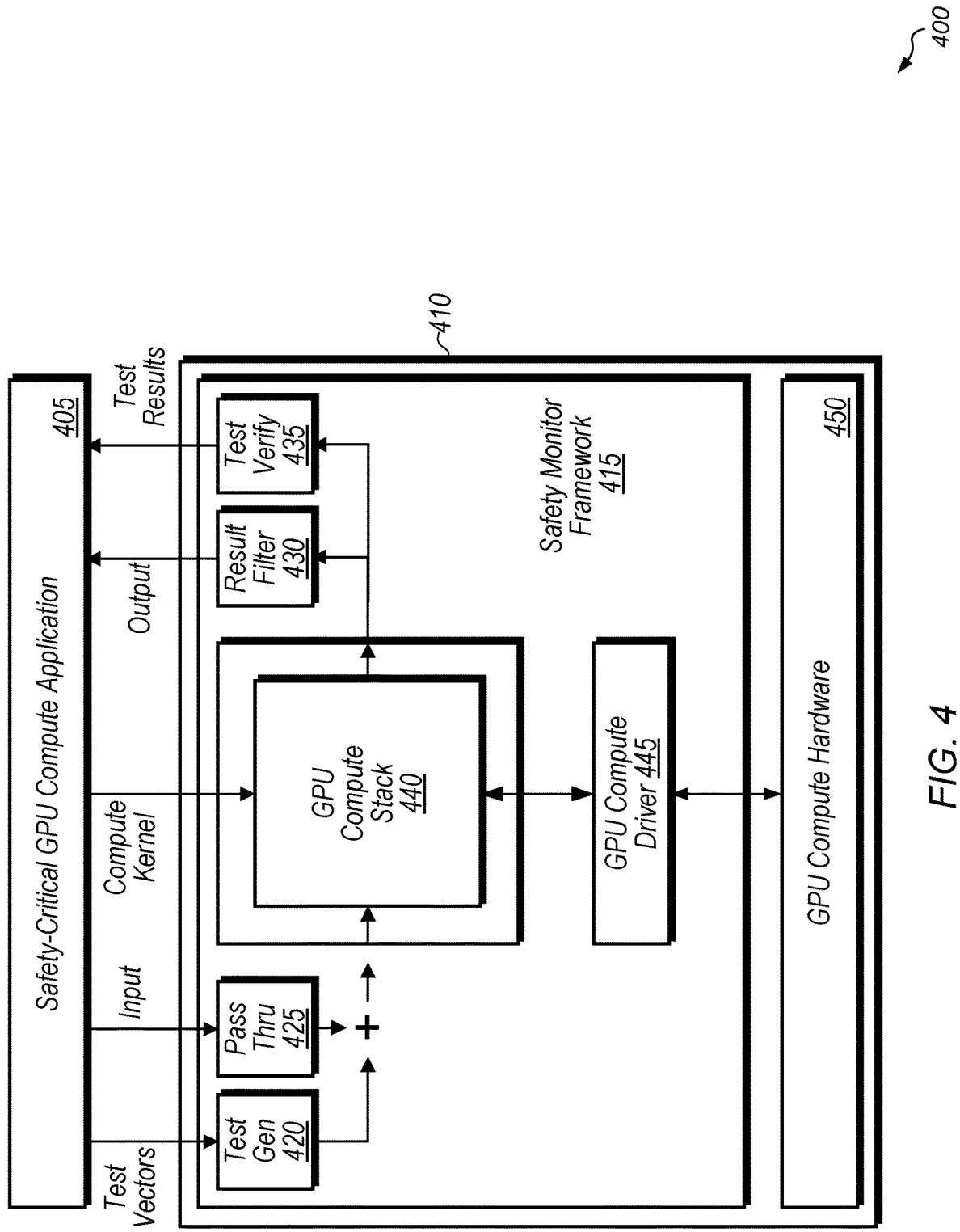
FIG. 4 is a block diagram of one implementation of a GPU compute fault detection framework.

Turning now to FIG. 4, a block diagram of one implementation of a GPU compute fault detection system (or "framework") 400 is shown. In one implementation, a computing system 410 includes a safety monitor framework 415 and GPU compute hardware 450. In various implementations, GPU compute hardware 450 includes hardware and/or software that is specialized for the purpose of accelerating certain parallel processing tasks. In other implementations, general purpose hardware and/or software can be used rather than a GPU in order to speed processing of parallel processing tasks. In one implementation, safety monitor framework 415 includes a test generation unit 420, pass through unit 425, result filter 430, test verify unit 435, GPU compute stack 440, and GPU compute driver 445. In other implementations, safety monitor framework 415 includes other components and/or is arranged in other suitable manners. In one implementation, safety monitor framework 415 is designed to be compliant with the Automatic Safety Integrity Level (ASIL) risk classification scheme. In other implementations, safety monitor framework 415 can be designed to comply with other risk classification schemes in other types of environments.

In one implementation, a safety-critical GPU compute application 405 conveys inputs to safety monitor framework 415. In various implementations, the inputs include a compute grid, test vectors, and a compute kernel. In other implementations, the inputs can include other types of data. In one implementation, safety-critical GPU compute application 405 specifies a compute grid with a corresponding compute kernel for GPU compute hardware 450 to execute. In one implementation, GPU compute hardware 450 contains hardware primitives to speed up processing of the compute kernel. In various implementations, the output result of GPU compute hardware 450 is a transformed dataset and/or metadata indicating results from processing the compute grid.

As used herein, the term "compute grid" is defined as a representation of a workload of a dataset and/or some number of threads to be executed. Compute grids are used for computations that require a large number of thread blocks to operate in parallel. In one implementation, the compute grid is composed of a plurality of tiles, with each tile including some number of threads to be executed. The number of threads that are included in each tile varies according to the implementation. Additionally, depending on the implementation, the grid can be partitioned into one, two, or three dimensions.

In one implementation, test generation unit 420 adds extra tiles to the received test grid. In one implementation, the test vectors are received and used by test generation unit 420 to determine which data and/or threads to add to the extra tiles. The test vectors also have corresponding known good results which are used to determine whether the actual results generated by GPU compute hardware 450 are accurate. The test vectors are typically generated by testers and/or a domain expert to provide good coverage of the specific algorithm or use cases being implemented. These test vectors are used to validate the correctness of the algorithm, in terms of both hardware and software, in a controlled environment. Any failures detected on these known good test vectors would indicate problems in the overall flow, caused by software/hardware installation issues and/or software/hardware malfunction or other issues. After test generation unit 420 adds one or more extra tiles to the original compute grid to create a modified compute grid, the GPU compute stack 440 conveys the modified compute grid and the compute kernel to the GPU compute hardware 450. In one implementation, the modified compute grid and the compute kernel are conveyed to the GPU compute hardware 450 via GPU compute driver 445.

The GPU compute hardware 450 processes the modified compute grid using the provided compute kernel, and then the GPU compute hardware 450 returns the processing results to GPU compute stack 440. In various implementations, GPU compute hardware 450 performs a variety of functions that include (but are not limited to) image color conversion, pixel-wise image operations, image scaling and filtering, Gaussian and Laplacian pyramids, histogram and statistical operations, tensor operations, classification, feature detection, tracking, control flow operations, convolution, deconvolution, fully connected layers, maximum pooling, average pooling, activations, local response normalization, softmax, region of interest pooling, and others. In one implementation, these functions are specified within the compute kernel which is dispatched from safety-critical GPU compute application 415 to GPU compute hardware 450.

In one implementation, result filter 430 analyzes the results and also filters the results to remove results corresponding to the extra tiles that were added to the original compute grid. Result filter 430 conveys filtered results and meta information to application 405. The meta information can include any type of data with the type varying according to the implementation. For example, in one implementation, if application 405 is attempting to identify faces in an image, then the meta information will include whether any faces were detected, the number of faces, and their locations within the image. In other implementations, other data can be conveyed in the meta information depending on what application 405 is interested in finding or processing within the compute grid.

In one implementation, the results from GPU compute hardware 450 are analyzed by test verify unit 435. Test verify unit 435 determines whether the extra tile(s) added to the original compute grid were correctly processed and/or classified by the GPU compute hardware 450. If test verify unit 435 determines that GPU compute hardware 450 correctly processed the extra tiles, then test verify unit 435 returns a passing test result indicator to application 405. For example, in one implementation, if the extra tiles are transformed into the expected test vector output or equivalent metadata, then the calculation by GPU compute hardware 450 is considered correct. Otherwise, if the known good objects were processed incorrectly, then test verify unit 435 returns a failing test result indicator to application 405. In response to receiving the failing test result indicator, application 405 can take any of various corrective actions (e.g., reboot, generate error, retry the same compute grid, redispatch the compute kernel).

Figure 5:
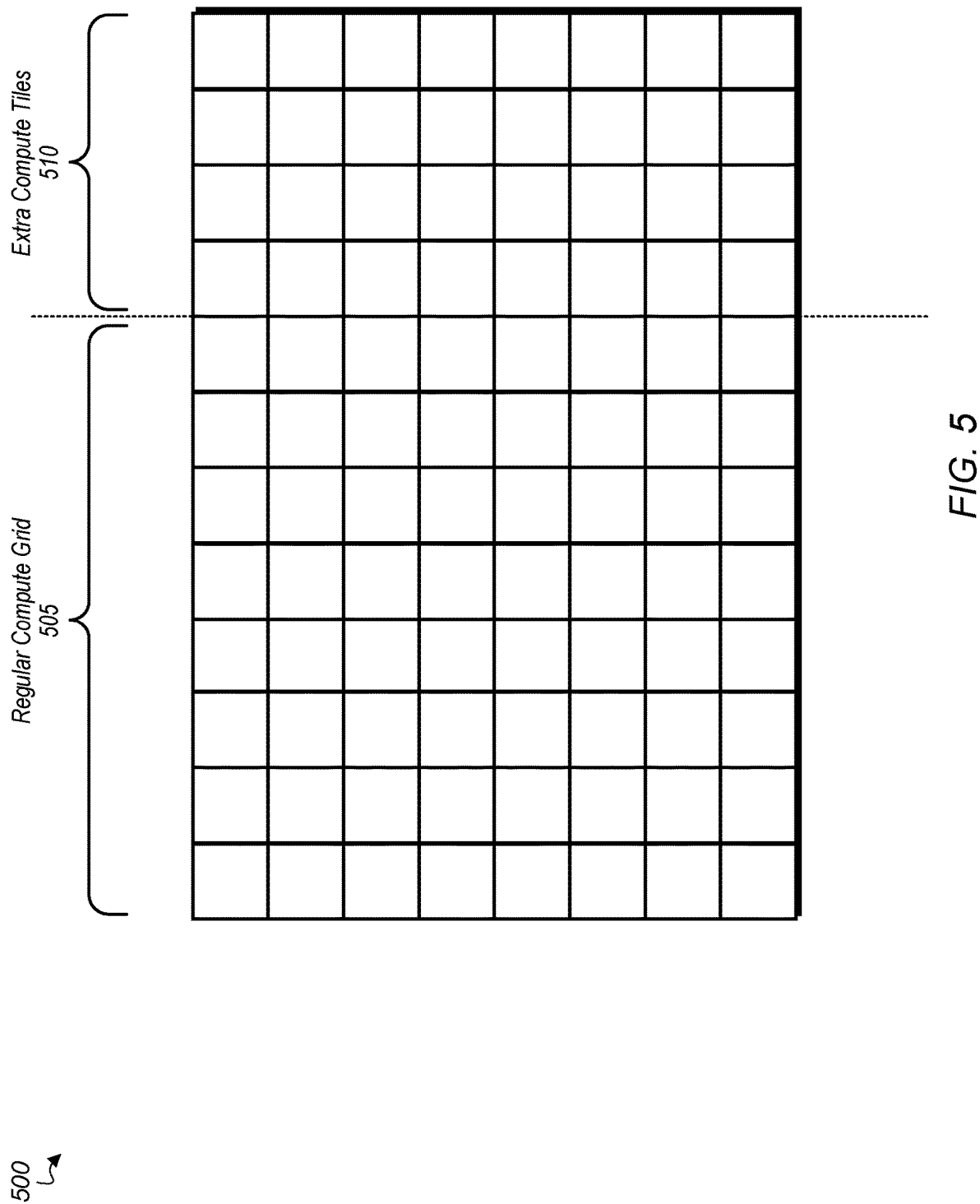
FIG. 5 is a modified compute grid which is provided to a processing unit for execution in accordance with one implementation.

Referring now to FIG. 5, an example of a modified compute grid 500 which is provided to a processing unit for execution in accordance with one implementation is shown. In one implementation, a regular compute grid 505 is prepared for execution by a software application. Rather than simply providing regular compute grid 505 to a processing unit (e.g., GPU 205 of FIG. 2) for execution, a safety monitor framework (e.g., safety monitor framework 415 of FIG. 4) adds extra compute tiles 510 to the regular compute grid 505 to form modified compute grid 500. Then, the modified compute grid 500 is provided to the processing unit for processing. The processing unit will process the extra compute tiles 510 in the same manner as the tiles of regular compute grid 505. It should be understood that the number of extra compute tiles 510 added to regular compute grid 505 are merely shown for illustrative purposes. In other cases, the number of extra compute tiles 510 that are added are determined so that the total size of grid 500 fits a power of two dimension.

In one implementation, the safety monitor framework generates extra compute tiles 510 based on known test vectors. In this implementation, after the processing unit has processed extra compute tiles 510, the safety monitor framework checks the actual results for the extra compute tiles 510 against the expected results for the known test vectors. If the results match, then the safety monitor framework concludes that the processing unit and kernel are still valid. Otherwise, if the results differ, then the safety monitor framework concludes that there is a fault associated with either the processing unit or the kernel. The safety monitor framework takes corrective action in the case when the results differ. In one implementation, the corrective action involves notifying the application of the potential fault. In other implementations, other corrective actions can be taken (e.g., rerun the modified compute grid 500, shutdown the system).

Figure 6:
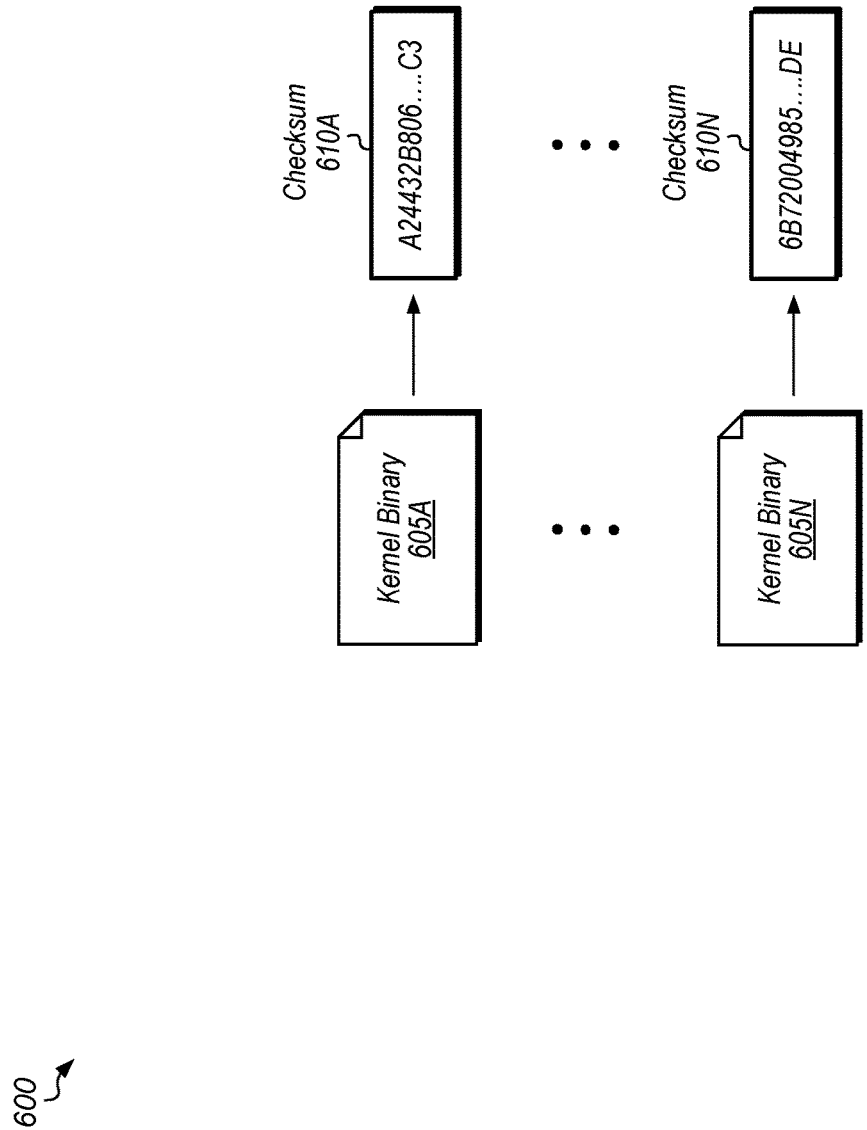
FIG. 6 is a diagram of one implementation of computing and storing checksums for kernel binaries.

Turning now to FIG. 6, a diagram of one implementation of computing and storing checksums 610A-N for kernel binaries 605A-N is shown. Kernel binaries 605A-N are representative of any number of kernel binaries that are generated and stored by a given computing system. In one implementation, after a given kernel (not shown) has been compiled into kernel binary 605A and validated, a checksum 610A is generated for the kernel binary 605A. During subsequent executions of the given kernel, a checksum is generated from the stored kernel binary 605A and compared to the stored checksum 610A. If the newly generated checksum matches the stored checksum 610A, then this indicates that the stored kernel binary 605A is still valid. In other words, the stored kernel binary 605A has not been accidentally modified. Similarly, checksum 610N is generated from kernel binary 605N during an initial execution and stored and used for checking for accidental modification of kernel binary 605N prior to subsequent executions of kernel binary 605N. It is noted that in other implementations, other types of signatures besides checksums can be computed for kernel binaries 605A-N to allow for kernel binaries 605A-N to be validated.

Figure 7:
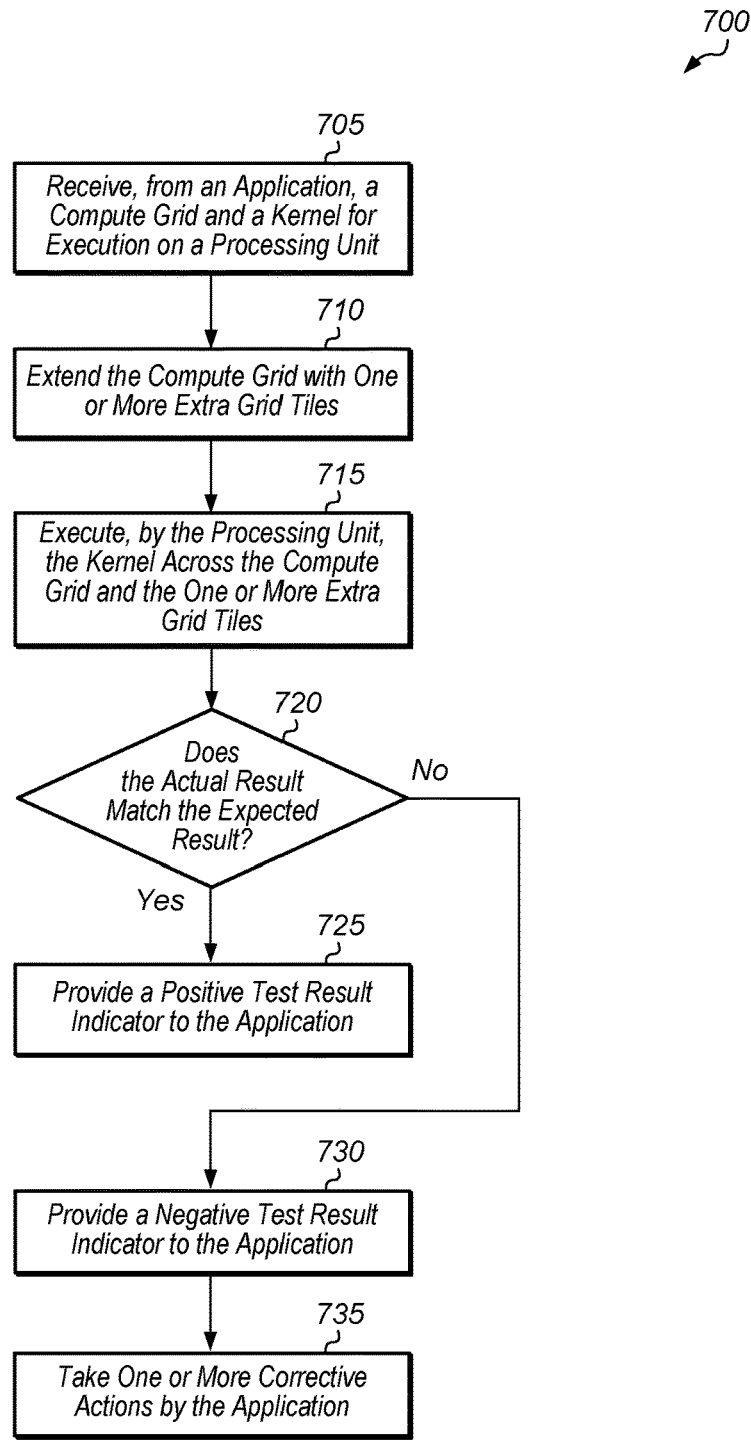
FIG. 7 is a generalized flow diagram illustrating one implementation of a method for operating a safety monitor framework for a processing unit.
Figure 8:
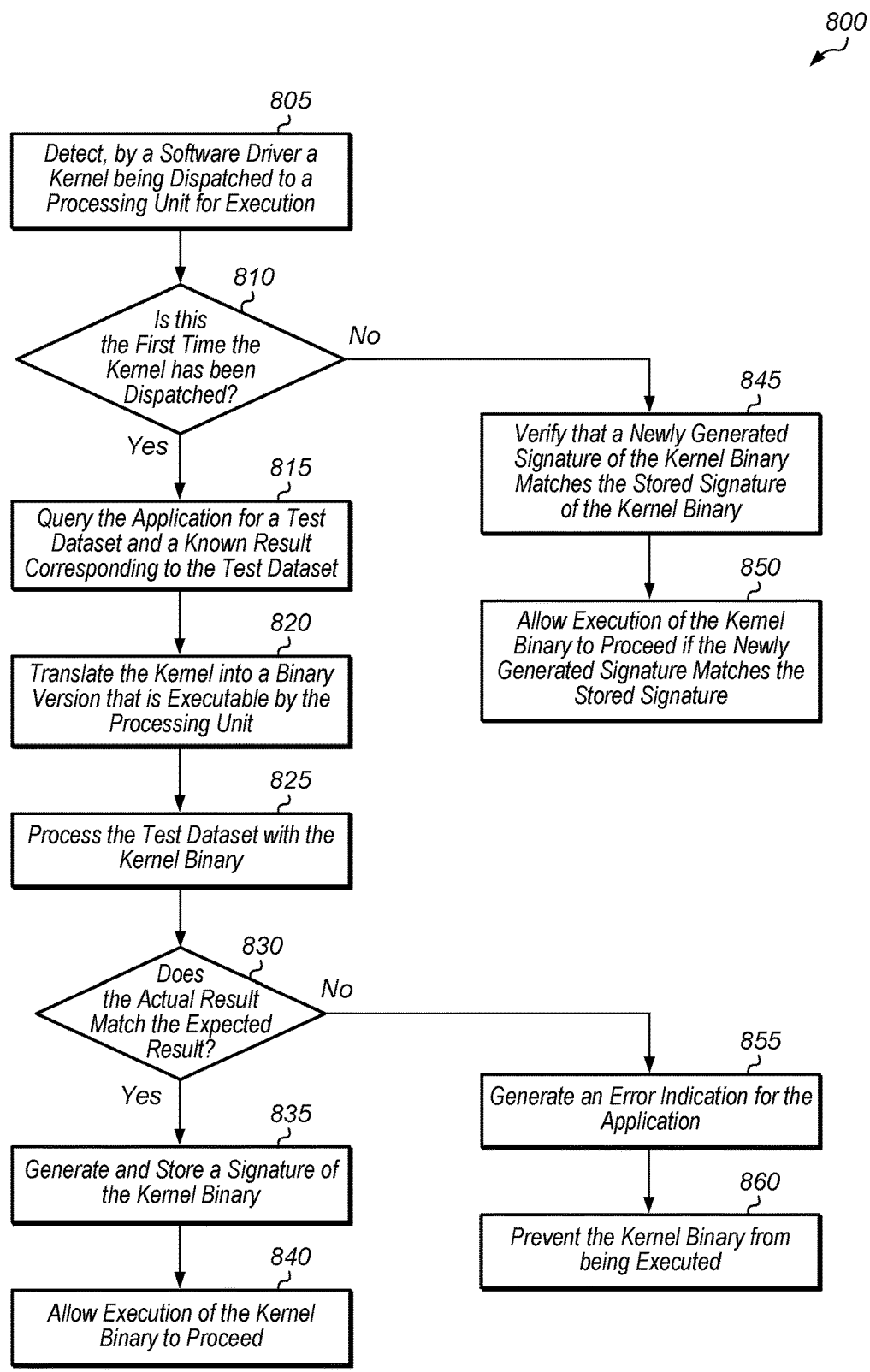
FIG. 8 is a generalized flow diagram illustrating one implementation of a method for validating kernels being executed on a processing unit.

Referring now to FIG. 7, one implementation of a method 700 for operating a safety monitor framework for a processing unit is shown. For purposes of discussion, the steps in this implementation and those of FIG. 8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A software driver receives, from an application, a compute grid and a kernel for execution on a processing unit (block 705). In one implementation, the processing unit is a GPU. In other implementations, the processing unit is any of various other types of processing units (e.g., FPGA, ASIC, DSP). Next, the software driver extends the compute grid with one or more extra grid tiles (block 710). In one implementation, the one or more extra grid tiles are generated from a registered test vector. Next, the processing unit executes the kernel across the compute grid and the one or more extra grid tiles (block 715). After computation of the compute grid and extra grid tiles completes, the software driver compares an actual result from the one or more extra grid tiles with an expected result (conditional block 720).

If the actual result from the one or more extra grid tiles matches the expected result (conditional block 720, "yes" leg), then the software driver provides a positive test result indicator to the application (block 725). Otherwise, if the output from the one or more extra grid tiles does not match the expected output (conditional block 720, "no" leg), then the software driver provides a negative test result indicator to the application (block 730). In response to receiving the negative test result indicator, the application takes one or more corrective actions (block 735). Depending on the implementation, the corrective actions can include retrying the compute grid, shutting down and restarting the computing system, and/or other actions. After blocks 725 and 735, method 700 ends.

Turning now to FIG. 8, one implementation of a method 800 for validating kernels being executed on a processing unit is shown. A software driver detects a kernel being dispatched to a processing unit for execution (block 805). If this is the first time the kernel has been dispatched (conditional block 810, "yes" leg), then the driver queries the application for a test dataset and a known result corresponding to the test dataset (block 815). Also, the kernel is translated into a binary version that is executable by the processing unit (block 820). Next, the driver processes the test dataset with the kernel binary (block 825). If the actual result from the kernel binary matches the expected result (conditional block 830, "yes" leg), then the kernel binary is considered validated, and a signature is generated and stored for the kernel binary (block 835). Also, execution of the kernel binary is allowed to proceed (block 840). After block 840, method 800 ends.

If this is not the first time the kernel has been dispatched (conditional block 810, "no" leg), then the driver verifies that a newly generated signature of the kernel binary matches the stored signature of the kernel binary (block 845). The driver allows execution of the kernel binary to proceed if the newly generated signature matches the stored signature (block 850). After block 850, method 800 ends. If the result from the kernel binary does not match the expected result (conditional block 830, "no" leg), then the driver generates an error indication for the application (block 855), and the driver prevents the kernel binary from being executed (block 860). After block 860, method 800 ends.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a first processing unit; and
 a second processing unit comprising circuitry configured to:
  receive an original compute grid and a kernel for execution on the first processing unit;
  extend the original compute grid, to create a modified compute grid, by one or more extra grid tiles;
  extend kernel computation to cover the one or more extra grid tiles;
  compare an actual result from the extra one or more grid tiles with an expected result after kernel computation of the modified compute grid has completed;
  generate an indicator that indicates whether the original compute grid was processed correctly, based on the compare; and
  perform one or more corrective actions responsive to the indicator indicating the original compute grid was not processed correctly.

2. The system as recited in claim 1, wherein the second processing unit is further configured to generate the extra one or more grid tiles based on a given test vector.

3. The system as recited in claim 2, wherein the expected results corresponds to a given test vector.

4. The system as recited in claim 1, wherein the one or more corrective actions comprise terminating a safety-critical application.

5. The system as recited in claim 1, wherein the second processing unit is further configured to:
 convert the kernel into a kernel binary;
 cause the kernel binary to be executed on a given test dataset; and
 allow the kernel binary to be executed on an actual dataset responsive to determining that the given test dataset was processed correctly.

6. The system as recited in claim 5, wherein the second processing unit is further configured to:
 generate a first signature of the kernel binary during a first dispatch of the kernel;
 store the first signature of the kernel binary;
 generate a second signature of the kernel binary on a second dispatch of the kernel; and
 allow the kernel binary to be executed on the first processing unit after the second dispatch responsive to determining that the second signature matches the first signature.

7. A method comprising:
 receiving, by a second processing unit comprising circuitry, an original compute grid and a kernel for execution on a first processing unit;
 extending the original compute grid, to create a modified compute grid, by one or more extra grid tiles;
 extending kernel computation to cover the one or more extra grid tiles;
 comparing, by the second processing unit, an actual result from the extra one or more grid tiles with an expected result after kernel computation of the modified compute grid has completed;
 generating an indicator that indicates whether the original compute grid was processed correctly, based on said comparing; and
 performing one or more corrective actions responsive to the indicator indicating the original compute grid was not processed correctly.

8. The method as recited in claim 7, further comprising generating the extra one or more grid tiles based on a given test vector.

9. The method as recited in claim 8, wherein the known good expected results correspond to a given test vector.

10. The method as recited in claim 7, wherein the one or more corrective actions comprise terminating a safety-critical application.

11. The method as recited in claim 7, further comprising:
 converting the kernel into a kernel binary;
 causing the kernel binary to be executed on a given test dataset; and
 allowing the kernel binary to be executed on an actual dataset responsive to determining that the given test dataset was processed correctly.

12. The method as recited in claim 11, further comprising:
 generating a first signature of the kernel binary during a first dispatch of the kernel;
 storing the first signature of the kernel binary;
 generating a second signature of the kernel binary on a second dispatch of the kernel; and
 allowing the kernel binary to be executed on the first processing unit after the second dispatch responsive to determining that the second signature matches the first signature.

13. The method as recited in claim 7, further comprising comparing an actual result from the extra one or more grid tiles with an expected result after kernel computation of the modified compute grid has completed.

14. An apparatus comprising:
 a memory storing program instructions; and
 a first processing unit coupled to the memory, wherein the program instructions are executable by circuitry of the first processing unit to:

receive an original compute grid and a kernel for execution on a second processing unit;

extend the original compute grid, to create a modified compute grid, by one or more extra grid tiles;

extend kernel computation to cover the one or more extra grid tiles;

compare an actual result from the extra one or more grid tiles with an expected result after kernel computation of the modified compute grid has completed;

generate an indicator that indicates whether the original compute grid was processed correctly, based on the compare; and perform one or more corrective actions responsive to the indicator indicating the original compute grid was not processed correctly.

15. The apparatus as recited in claim 14, wherein the program instructions are further executable by the processing unit to generate the extra one or more grid tiles based on a given test vector.

16. The apparatus as recited in claim 15, wherein the expected results corresponds to a given test vector.

17. The apparatus as recited in claim 14, wherein the one or more corrective actions comprise terminating a safety-critical application.

18. The apparatus as recited in claim 14, wherein the program instructions are further executable by the processing unit to:

convert the kernel into a kernel binary;

cause the kernel binary to be executed on a given test dataset; and allow the kernel binary to be executed on an actual dataset responsive to determining that the given test dataset was processed correctly.

19. The apparatus as recited in claim 18, wherein the program instructions are further executable by the processing unit to:

generate a first signature of the kernel binary during a first dispatch of the kernel;

store the first signature of the kernel binary;

generate a second signature of the kernel binary on a second dispatch of the kernel; and allow the kernel binary to be executed on the second processing unit after the second dispatch responsive to determining that the second signature matches the first signature.

* * * * *

UNITED STATES PATENT AND TRADEMARK OFFICE
CERTIFICATE OF CORRECTION

PATENT NO. : 12,045,675 B2
APPLICATION NO. : 16/457237
DATED : July 23, 2024
INVENTOR(S) : Kwong et al.

Page 1 of 1

It is certified that error appears in the above-identified patent and that said Letters Patent is hereby corrected as shown below:

In the Claims

Column 10, Claim 9, Line 37 and 38, please delete "wherein the known good expected results" and insert -- wherein the expected results --.

Signed and Sealed this
Thirty-first Day of December, 2024

Derrick Brent
*Acting Director of the United States Patent and Trademark Office*